(12) United States Patent
Gilbert (10) Patent No.: US 7,720,744 B2
(45) Date of Patent: May 18, 2010

(54) SYSTEMS AND METHODS FOR SHIFTING BIDS AND OFFERS IN A TRADING INTERFACE

(75) Inventor: Andrew C Gilbert, Califon, NJ (US)

(73) Assignee: BGC Partners, Inc., New York, NY (US)

( * ) Notice: Subject to any disclaimer, the term of this patent is extended or adjusted under 35 U.S.C. 154(b) by 933 days.

(21) Appl. No.: 09/858,091

(22) Filed: May 15, 2001

(65) Prior Publication Data

US 2002/0073014 A1 Jun. 13, 2002

Related U.S. Application Data

(60) Provisional application No. 60/251,808, filed on Dec. 7, 2000.

(51) Int. Cl.
*G06Q 40/00* (2006.01)
(52) U.S. Cl. ....................... 705/37; 705/36 R
(58) Field of Classification Search ................ 705/36, 705/37, 36 R
See application file for complete search history.

(56) References Cited

U.S. PATENT DOCUMENTS

| | | | | |
|---|---|---|---|---|
| 3,573,747 | A * | 4/1971 | Adams et al. | ............... 705/37 |
| 4,674,044 | A | 6/1987 | Kalmus et al. | |
| 5,101,353 | A | 3/1992 | Lupien et al. | |
| 5,243,331 | A * | 9/1993 | McCausland et al. | ....... 345/172 |
| 5,297,032 | A * | 3/1994 | Trojan et al. | ............... 705/37 |
| 5,715,402 | A * | 2/1998 | Popolo | ...................... 705/37 |
| 5,774,873 | A | 6/1998 | Berent et al. | |
| 5,809,483 | A | 9/1998 | Broka et al. | |
| 5,835,896 | A * | 11/1998 | Fisher et al. | ............... 705/37 |
| 5,845,266 | A | 12/1998 | Lupien et al. | |
| 6,006,201 | A | 12/1999 | Berent et al. | |
| 6,016,483 | A | 1/2000 | Rickard et al. | |
| 6,098,051 | A | 8/2000 | Lupien et al. | |
| 6,112,189 | A | 8/2000 | Rickard et al. | |
| 6,134,535 | A | 10/2000 | Belzberg | |
| 6,199,050 | B1 * | 3/2001 | Alaia et al. | ............... 705/37 |
| 6,278,982 | B1 | 8/2001 | Korhammer et al. | |

(Continued)

FOREIGN PATENT DOCUMENTS

EP 0 401 203 A2 12/1990

(Continued)

OTHER PUBLICATIONS

Andrews, E.L., "Wireless Bidders Jostle for Position", The New York Times, New York, Dec. 5, 1994.*

(Continued)

*Primary Examiner*—Olabode Akintola
(74) *Attorney, Agent, or Firm*—Ruth Ma (57) ABSTRACT

Systems and methods for shifting bids and/or offers in a trading interface are provided. Using these systems and methods, a trader may access various bid and/or offer data, adjust bid and/or offer statuses, and shift a plurality of bid and/or offer prices and sizes to accommodate for changes in a trading environment. The trading interface may provide users with multiple bid and/or offer interaction. This may allow users to apply changes to a plurality of bids and/or offers simultaneously and provide time efficient bid and/or offer shifting. Furthermore, the trading interface may allow the user to access or import books from various trading applications.

20 Claims, 10 Drawing Sheets

U.S. PATENT DOCUMENTS

| | | | |
|---|---|---|---|
| 6,390,472 B1 * | 5/2002 | Vinarsky | 273/278 |
| 6,408,282 B1 * | 6/2002 | Buist | 705/36 R |
| 6,499,018 B1 * | 12/2002 | Alaia et al. | 705/37 |
| 6,598,026 B1 * | 7/2003 | Ojha et al. | 705/26 |
| 6,609,112 B1 * | 8/2003 | Boarman et al. | 705/37 |
| 6,659,861 B1 * | 12/2003 | Faris et al. | 463/1 |
| 6,754,639 B2 * | 6/2004 | Ginsberg | 705/36 |
| 6,892,186 B1 * | 5/2005 | Preist | 705/37 |
| 6,952,682 B1 * | 10/2005 | Wellman | 705/37 |
| 2001/0023414 A1 | 9/2001 | Kumar et al. | |
| 2001/0032163 A1 | 10/2001 | Fertik et al. | |
| 2001/0034688 A1 | 10/2001 | Annunziata | |
| 2001/0051907 A1 | 12/2001 | Kumar et al. | |
| 2002/0029180 A1 | 3/2002 | Kirwin et al. | |
| 2002/0049667 A1 * | 4/2002 | Navani et al. | 705/37 |

FOREIGN PATENT DOCUMENTS

| | | |
|---|---|---|
| EP | 1 118 953 A2 | 7/2001 |
| WO | WO 96/34357 | 10/1996 |
| WO | WO 00/26834 A2 | 5/2000 |

OTHER PUBLICATIONS

Figler, A., "California's MWD Using Web for $100 Million Sale", Bond Buyer, New York, Nov. 2, 1999.*

* cited by examiner

FIG.2

NEW BID/OFFER

Item:
Price:    Size:

SHIFT PARAMETERS — 130

Type: Absolute    Relative    Default
Price:    Size:    ○ Shift Up
                   ○ Shift Down
         ○ Shift Up
         ○ Shift Down

— 124

200

BOOKS
Open
Import

STATUS
Active
Suspend
Cancel

□ Select All   □ Clear Selections

| BOOK: Treasury Bonds | | | |
|---|---|---|---|
| ITEM | SIZE | PRICE | STATUS |
| 5 YR Bond | 1 | $100.00 | Suspend |
| 10 YR Bond | 2 | $98.00 | Suspend |
| 30 YR Bond | 1 | $97.27 | Suspend |

138

OK — 154
CLOSE
SETUP — 158

FIG.3

SETUP

DEFAULT SHIFT SETTINGS

STATUS
- Active
- Suspend

SHIFT PARAMETERS

Type: Absolute | Relative

Price: 5.00 % | 6.50 %
- Shift Up / Shift Down
- Shift Up / Shift Down

PREFERENCES

OPERATION MODE
- Manual
- Automatic

Automatic Settings

OK | CANCEL

NEW BID/OFFER

Item: ▶
Price: ▶    Size: ▶

SHIFT PARAMETERS

Type: Absolute    Relative    Default
Price: ▶    Size: ▶
○ ○ Shift Up / Shift Down    ○ ○ Shift Up / Shift Down

BOOKS
Open
Import

STATUS
Active
Suspend
Cancel

OK
CLOSE
SETUP

☐ Select All  ☐ Clear Selections — 416

BOOK: Tech Stocks

| | ITEM | SIZE | PRICE | STATUS |
|---|---|---|---|---|
| A | AMD | 50 | $24.30 | Active |
| ✓ | CSCO | 35 | $13.72 | Cancel |
| ✓ | INTC | 100 | $25.15 | Active |

NEW BID/OFFER

Item:
Price: Size:

SHIFT PARAMETERS

Type: Default
Absolute
Price: Size:
$10.00
● Shift Up ○ Shift Up
○ Shift Down ○ Shift Down

BOOKS
Open
Import

STATUS
Active
Suspend
Cancel

☒ Select All ☐ Clear Selections

OK
CLOSE
SETUP

BOOK: Internet Stocks

| ITEM | SIZE | PRICE | STATUS |
|------|------|-------|--------|
| YHOO | 100 | $12.00 | Suspend |
| EBAY | 150 | $30.98 | Suspend |
| AMZN | 300 | $8.47 | Suspend |

BOOKS
- Open
- Import

STATUS
- Active — 110
- Suspend
- Cancel

108

NEW BID/OFFER
- Item:
- Price: ▶  Size: ▶

SHIFT PARAMETERS
- Type: Absolute  Relative  Default
- Price: ▶  Size: ▶
- ○ Shift Up   ○ Shift Up
- ○ Shift Down ○ Shift Down

- OK
- CLOSE — 154
- SETUP

☐ Select All  ☐ Clear Selections

BOOK: Internet Stocks

| ITEM | SIZE | PRICE | STATUS |
|------|------|-------|--------|
| YHOO | 100  | $12.00 | Active |
| EBAY | 150  | $30.98 | Active |
| AMZN | 300  | $8.47  | Active |

410 — PRICE column
412 — STATUS column
138 — checkmarks column

BOOKS
- Open
- Import

NEW BID/OFFER
Item: [▼]
Price: [▼]  Size: [▶]

STATUS — 108
- Active
- Suspend
- Cancel — 114

SHIFT PARAMETERS
Type: Absolute | Relative | Default
Price: [▶] ○ Shift Up  ○ Shift Down
Size: [▶] ○ Shift Up  ○ Shift Down

- OK — 154
- CLOSE
- SETUP

☐ Select All   ☐ Clear Selections

BOOK: Securities (Electric & Communication)

| ITEM | SIZE | PRICE | STATUS |
|------|------|-------|--------|
| CIN  | 50   | $33.72 | Active |
| BLS  | 40   | $40.00 | Suspend |
| REI  | 25   | $45.80 | Active |

BOOKS
- Open
- Import

STATUS
- Active
- Suspend
- Cancel

NEW BID/OFFER
Item: ▶
Price: ▬ Size: ▬ ▶

SHIFT PARAMETERS
Type: Absolute ▶ Relative Default
Price: ▶ Size: ▶
○ Shift Up   ○ Shift Up
○ Shift Down ○ Shift Down

- OK
- CLOSE
- SETUP

☐ Select All   ☐ Clear Selections

BOOK: Securities (Electric & Communication)

| ITEM | SIZE | PRICE | STATUS |
|------|------|-------|--------|
| REI  | 25   | $45.80 | Active |

SYSTEMS AND METHODS FOR SHIFTING BIDS AND OFFERS IN A TRADING INTERFACE

CROSS REFERENCE TO RELATED APPLICATION

This application claims the benefit of United States Provisional Patent Application Ser. No. 60/251,808, filed Dec. 7, 2000, which is hereby incorporated by reference herein in its entirety.

BACKGROUND OF THE INVENTION

This invention relates to shifting bids and/or offers. More particularly, this invention relates to systems and methods for shifting bids and/or offers in a trading interface.

Electronically based trading systems have gained widespread popularity in recent years. Such trading systems are frequently used for trading items ranging from financial instruments (such as stocks, bonds, currency, futures contracts, etc.) to used household goods (such as old records, antiques, etc.).

In many of these trading systems, bid/offer-hit/take processes are used to negotiate a sale of a given item. In connection with such processes, bids and/or offers for items are entered into a trading system and a hit or take is submitted in response to a bid or offer, respectively, to agree to a sale.

Many times, a trader may have multiple bids and/or offers that he or she wants to maintain in the trading system. These bids and/or offers are frequently referred to as a "book." In connection with such a book of bids and/or offers, the trader may want to act upon all simultaneously. For example, in an instance where some factor has caused the prices of every bid and/or offer that the trader has in his book to change by the same amount (either an absolute amount, e.g., $5, or a relative amount, e.g., 5%), the trader may want to shift the prices of his or her bids and/or offers by that amount. Being able to shift prices in a single step may save the trader time (in not having to make the change for each bid and/or offer individually) as well as money (in not being subject to hits and/or lifts on his bids and/or offers while he is trying to change all of his bids and/or offers).

In view of the foregoing, it would be desirable to provide systems and methods for shifting bids and/or offers efficiently using a trading interface.

SUMMARY OF THE INVENTION

It is an object of this invention to provide systems and methods for shifting bids and/or offers in a trading interface.

In accordance with the invention, a user may be provided with a trading interface in order to shift bids and/or offers, as well as initiate other related trading commands. The trading interface may be capable of accessing various bid and/or offer data, controlling bid and/or offer statuses, and ultimately applying shift requests to bids and/or offers. The bids and/or offers may be inputted via the trading interface, loaded from existing books containing bid and/or offer data, imported from other suitable trading applications, or accessed through any other suitable means. Various shifting parameters may be provided to a user upon retrieving a list of bids and/or offers.

Furthermore, the present invention may provide users with multiple bid/offer interactions. For example, a user may choose to simultaneously shift a price or a size of a plurality of bids and/or offers, simultaneously cancel a plurality of bids and/or offers, or simultaneously suspend and/or make active a plurality of bids and/or offers. The ability to apply changes to a plurality of bids and/or offers simultaneously may provide the user with time efficient bid/offer shifting.

The present invention may be implemented with any type of trading system for the trading of any type of item.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

FIGS. 1-6b are illustrative display windows of a graphical user trading interface that may be presented in certain embodiments of the present invention. It should be noted that the trading interface presented here is only for illustrative purposes and various features, within the scope of the invention, may be added to or removed from the interface. Furthermore, for the purpose of clarity, and not by way of limitation, the trading interface, techniques, or methods herein are demonstrated primarily in the context of financial instruments. Although, the invention may be used with any suitable tradable item, such as financial instruments (e.g., stocks, bonds, currency, futures contracts, etc.), household goods (e.g., old records, antiques, etc.), energy related goods (e.g., electricity), or any other item suitable for trading.

For ease of description, FIGS. 1-7 are described in terms of bids although the same principles apply for offers.

Figure 1:
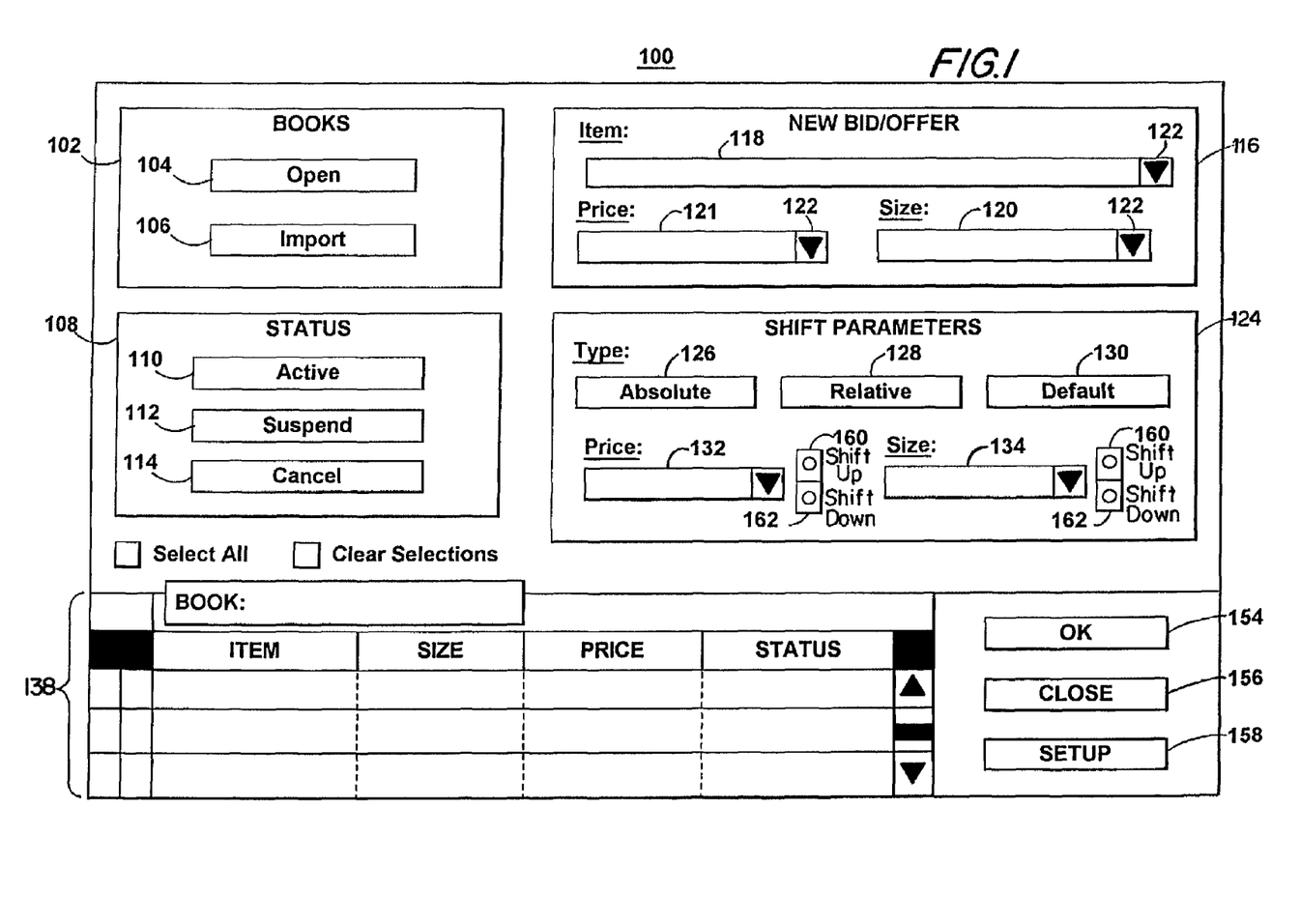
FIG. 1 is an illustrative trading interface display window in accordance with certain embodiments of the present invention.

FIG. 1 illustrates a trading interface display window 100 for providing trading features to a user. The trading interface may incorporate a "Books" selection menu 102, a "Status" selection menu 108, a "New Bid/Offer" selection menu 116, and a "Shift Parameters" selection menu 124.

Books selection menu 102 may provide the user with open option 104 and import option 106. Option 104 may allow the user to open an already existing book of bids in a trading application while option 106 may allow the user to import a book of bids from another application. For example, a user may access a trading interface at a remote location and import his or her books to the trading interface currently being operated. Multiple bid items (e.g., acquired from a book) may then be displayed to the user on a display 138. For example, the user may load a "Treasury Bonds" book. The bid items listed (e.g., 10 year bond, 30 year bond, etc.) in this particular book may be shown on display 138.

Status selection menu 108 may provide a user with an active option 110, a suspend option 112, and a cancel option 114. Options 110 and 112 may allow the user to define the status of a bid as being active or suspended. Option 114 may allow the user to remove an existing bid from the trading interface.

New Bid/Offer selection menu 116 may provide a user with an item display field 118, a size display field 120, and a price display field 121 to allow the user to introduce new bids into the trading system. Menu buttons 122, if selected, may provide the user with a pull down menu of pre-defined or previously used items, prices, and sizes.

Shift parameters selection menu 124 may provide the user with parameters for shifting bid prices. Such parameters may consist of a "Type" parameter, a "Price" parameter, and a "Size" parameter. Additional parameters may be defined. The "Type" parameter may provide an absolute option 126, a relative option 128, and a default option 130. For example, the user may shift bids by a particular percentage (e.g., using relative option 128) or by an actual monetary value (e.g., using absolute option 126). The "Price" and "Size" parameters may provide the user with display fields 132 and 134, respectively, for inputting a shift price and a shift size. In addition, the "Price" and "Size" parameters may each provide a user with a "Shift Up" option 160 and a "Shift Down" option 162. Options 160 and 162 may allow the user to indicate if he or she would like a price and/or size to be shifted up or shifted down by the shift amounts indicated in display fields 132 and 134. Either of the price and the size indicated for shifting bids may be dependent on the "Type" parameter selected (absolute or relative).

Trading display window 100 may also provide an "Ok" button 154, a "Close" button 156, and a "Setup" option 158. When a user selects a feature or designates a number of desired changes to be made to his or her bids, the user may execute his or her selections by selecting "Ok" button 154. If the user has completed and is satisfied with his or her changes, the user may choose to close the book, shown in display 138, by selecting "Close" button 156. "Setup" option 158 may also be made available to the user. Option 158 may provide the user with options to adjust settings (e.g., default shifting values).

Figure 2:
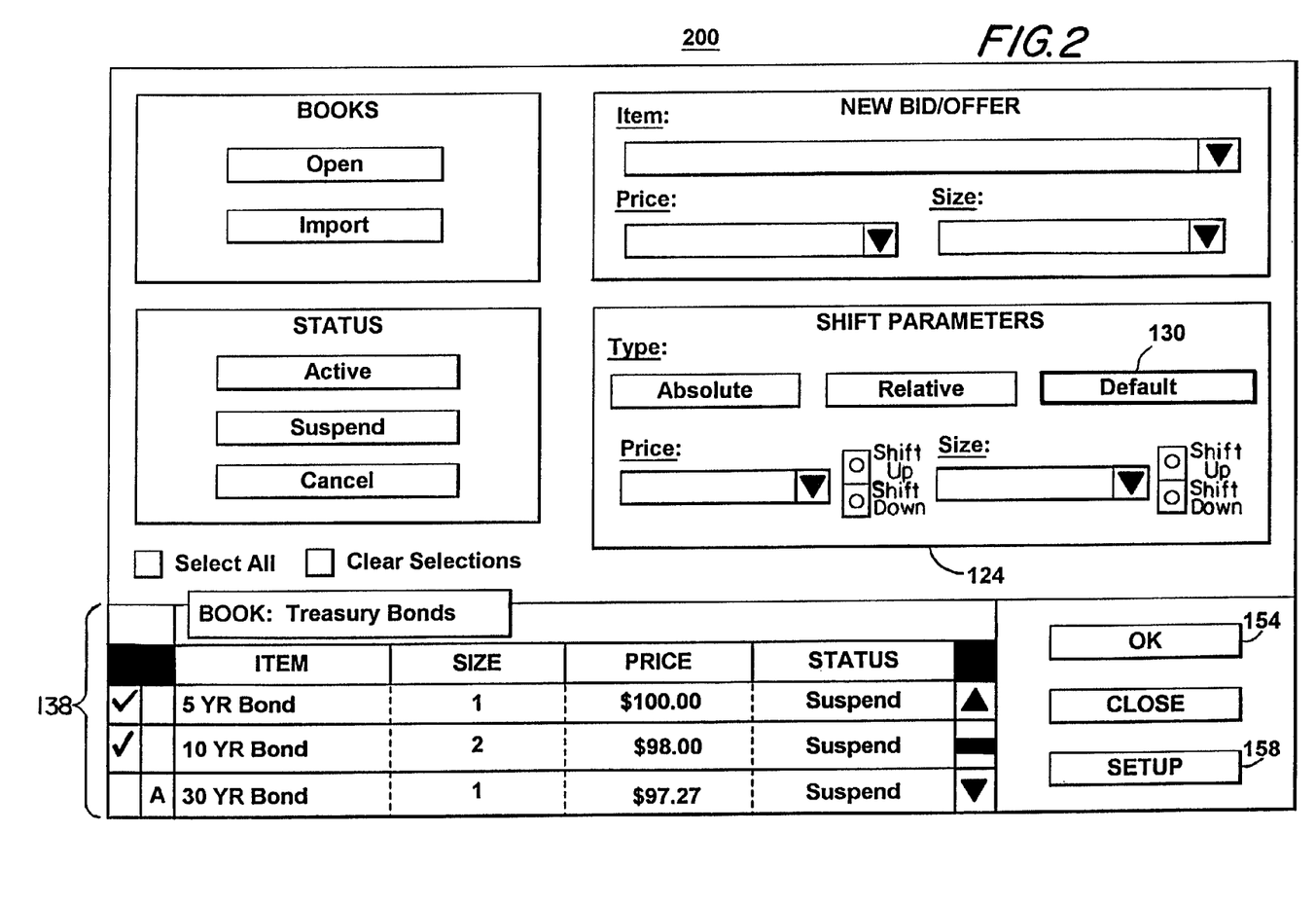
FIG. 2 is an illustration of default options in the trading interface display window in accordance with certain embodiments of the present invention.

In some embodiments, default instructions, that may have been previously defined, may be used in the trading interface. Display window 200 of FIG. 2 illustrates the use of default options in the trading interface. As an alternative to specifying a shift price and/or size, a user may allow the system to designate default values to selected items in display 138. For example, the user may initially select default option 130 (if the option is not already selected) in selection menu 124, select the items in display 138 for which the desired bid prices are to be shifted, and then select "Ok" button 154 to execute the default-value shift on all the designated items. In addition, default values may be automatically assigned to new bids that are manually entered. For example, when a new bid is entered by the user, the status of the bid may need to be identified. The user may wish to have all new bids assigned a status of active so that they may be hit. In this case, the default status value may be preset to active and when a new bid is entered it may be assigned an active status. Default parameters may be defined by the user through "Setup" option 158.

Figure 3:
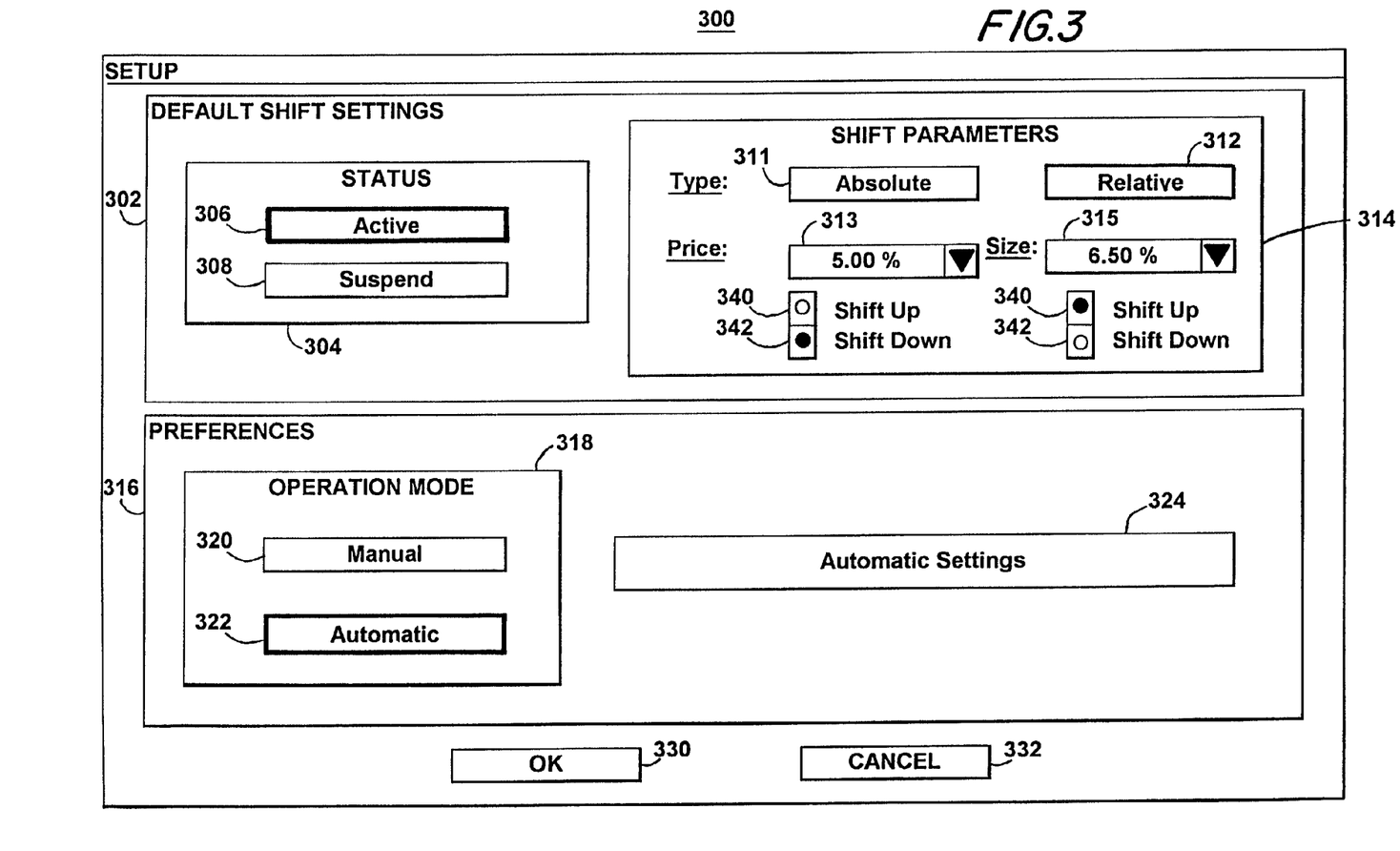
FIG. 3 is an illustrative setup menu in accordance with certain embodiments of the present invention.

FIG. 3 shows an illustrative setup display window 300 that may be provided to a user when setup option 158 is selected from the trading interface. Window 300 may provide a "Default Shift Settings" selection menu 302 and a "Preferences" selection menu 316. Selection menu 302 may allow users to establish a default bid status and default shift parameters through a menu 304 and a menu 314, respectively. In status menu 304, the user may indicate the default status of a bid item by choosing between an active status option 306 and a suspend status option 308. Similarly, menu 314 may allow a user to specify default shifting parameters for a bid item by providing the user with an absolute type option 311, a relative type option 312, an price display field 313, and a size display field 315. Menu 314 may also incorporate a "Shift Up" option 340 and a "Shift Down" option 342 to be used in connection with amounts indicated in display fields 313 and 315. For example, a user may choose to set a default price shift to execute a decrease in price by 5.00% and a default size shift to execute an increase in size by 6.50%. In order to do so, the user may select relative type shift 312 and indicate a price of 5.00% in display field 313 along with a selection of option 342 to shift the price down and indicate a size of 6.50% in display field 315 along with a selection of option 340 to shift the size up. Other suitable shifting combinations may be performed, for example, a user may choose to define a default price shift but not a default size shift and vice versa.

Selection menu 316 may include an operation mode menu 318 to provide a user with the ability to enable automatic designations (further discussed in FIG. 4) in the trading interface. Menu 318 may provide the user with a manual option 320 and an automatic option 322. If automatic option 322 is selected by the user, automatic settings option 324 may be made available to establish criteria for automatic operation. If manual option 320 is selected, designating automatic operations in the trading interface may be disabled. When manual option 320 is selected, automatic settings option 324 may be dimmed (or shaded) to indicate that the option is not available in the manual operation mode.

Figure 4:
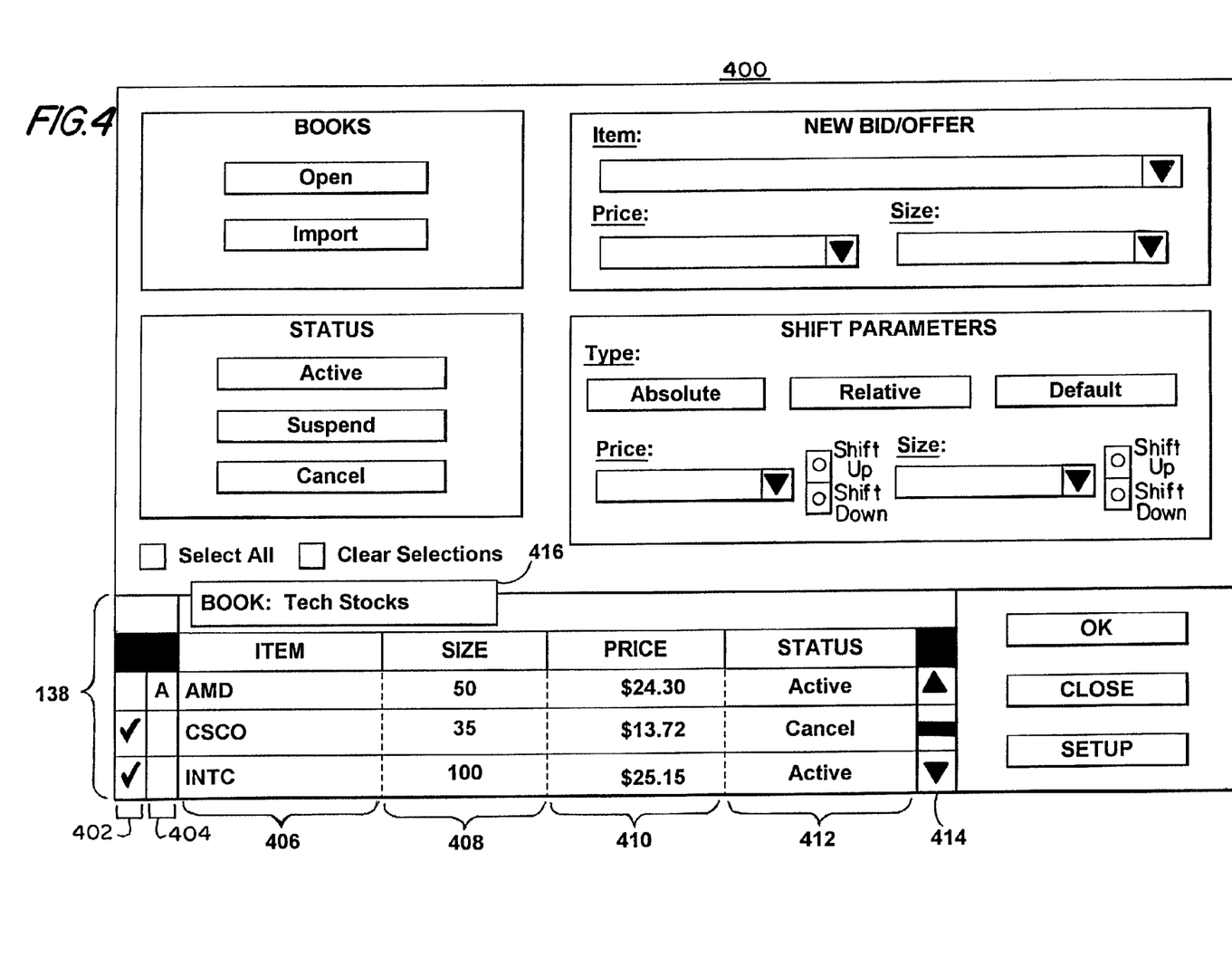
FIG. 4 is an illustrative book display in the trading interface display window in accordance with certain embodiments of the present invention.

An illustrative display of a bid book, that has been loaded into display 138, is shown in trading display window 400 of FIG. 4. Display 138 may provide a user with various information about the listing of bids. Information such as, an item name, an item size, a bid/offer price for an item, and an item's status may be displayed in an item field 406, a size field 408, a price field 410, and a status field 412, respectively. The name of the book listed in display 138 may also be shown in field 416. Arrows 414 may be used to scroll through the book's bids/offers (which may also be referred to as items). Field 402, of display 138, may indicate if an item has been selected. For example, the user may desire to issue trade commands (e.g., shifting bids) on multiple items in his or her book. To select the items of interest, the user may make indications in field 402 using, for example, a mouse-like device connected to a computer. Field 404, of display 138, may indicate if an item has been set to respond automatically. If desired, a user may indicate an item or items to be automatically responsive to specified trading factors. For example, a user may want to monitor very important items while he or she is away in order to keep up with factors that may affect the existing bid prices. After indicating items to be automatically responsive, the system may automatically shift bids when certain criteria (which may be user defined) are satisfied. User defined criteria may be setup through automatic settings 324 of FIG. 3.

Figure 5A:
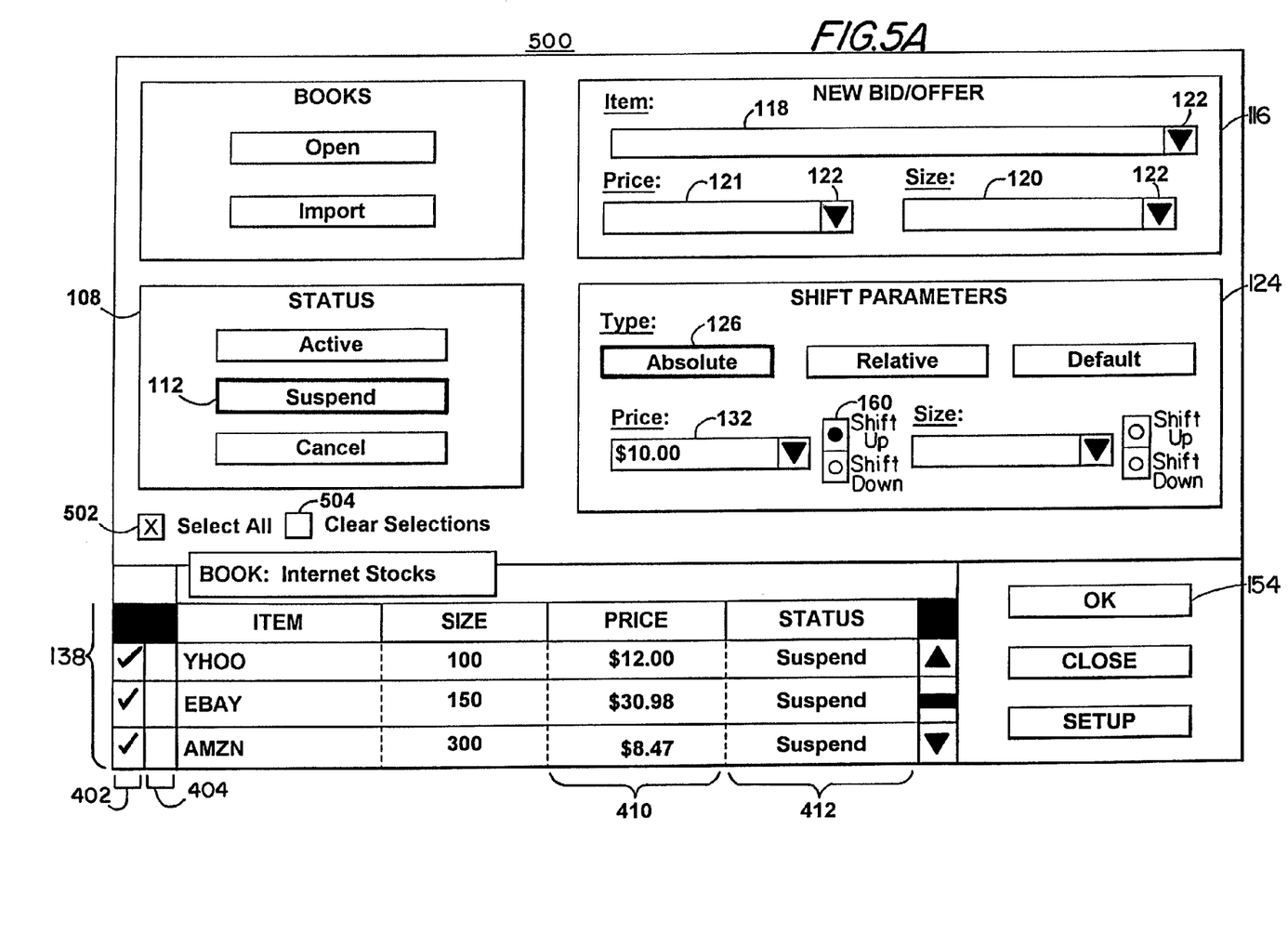
FIGS. 5a and 5b are illustrations of shifting bids and/or offers in the trading interface display window in accordance with certain embodiments of the present invention.
Figure 5B:
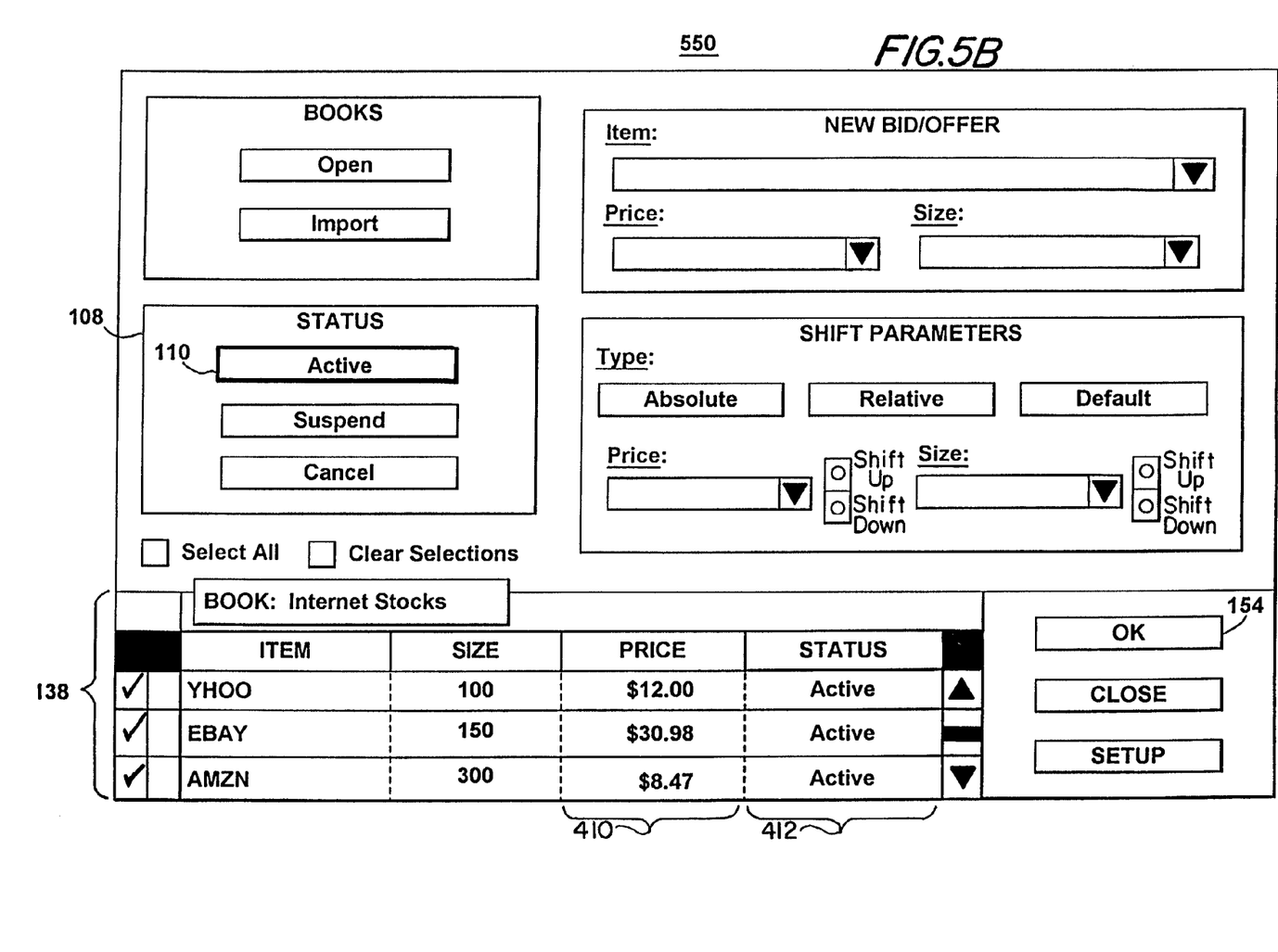

FIGS. 5a and 5b show illustrative displays of a user designating a bid status and shifting bid prices. In display window 500 of FIG. 5a, a user has chose to issue trading commands on all the items in his or her book listing as indicated by field 402.

The user has done this by using select all option 502. Clear selections option 504 is also available for de-selecting all currently selected items. When option 502 is selected, all the items in the book may be selected. For example, a user may wish to simultaneously shift all the bid prices listed in field 410 by a common amount. Initially, the user may suspend activity on the listed items in order to prevent any hits from taking place while the items are being updated. With all the bids of interest selected, the user may select suspend option 112 in selection menu 108 and then select "Ok" button 154 to execute the change. After the items have been updated to a suspended status, indicated in status field 412, the user may shift the bids simultaneously using the options provided in selection menu 124. If desired, the user may also shift his or her bids when status field 412 indicates that the bids are active in order to avoid having to suspend the bids first. For example, the user may shift up the prices of all his or her items by ten dollars. In order to do so, the user may select absolute option 126, input the desired amount (e.g., $10.00) in display field 132, select a shifting direction using option 160, and then execute the change by selecting "Ok" button 154.

When a user has completed shifting the bids in his or her book, the user may change the status of the items displayed in field 412 back from suspend to active (e.g., using option 110 in selection menu 108 and "Ok" button 154) if the bids were initially suspended before shifting. Re-activating the bids will make them available to be hit. Display window 550 of FIG. 5b illustrates the updated bid prices and bid statuses. Field 410 in display window 550 illustrates the new bid prices once the shift parameters (in display window 500 of FIG. 5a) have been executed.

Providing a user with an opportunity to adjust (e.g., shift) multiple bids simultaneously in this way may allow the user to more efficiently operate his or her trading system.

Figure 6A:
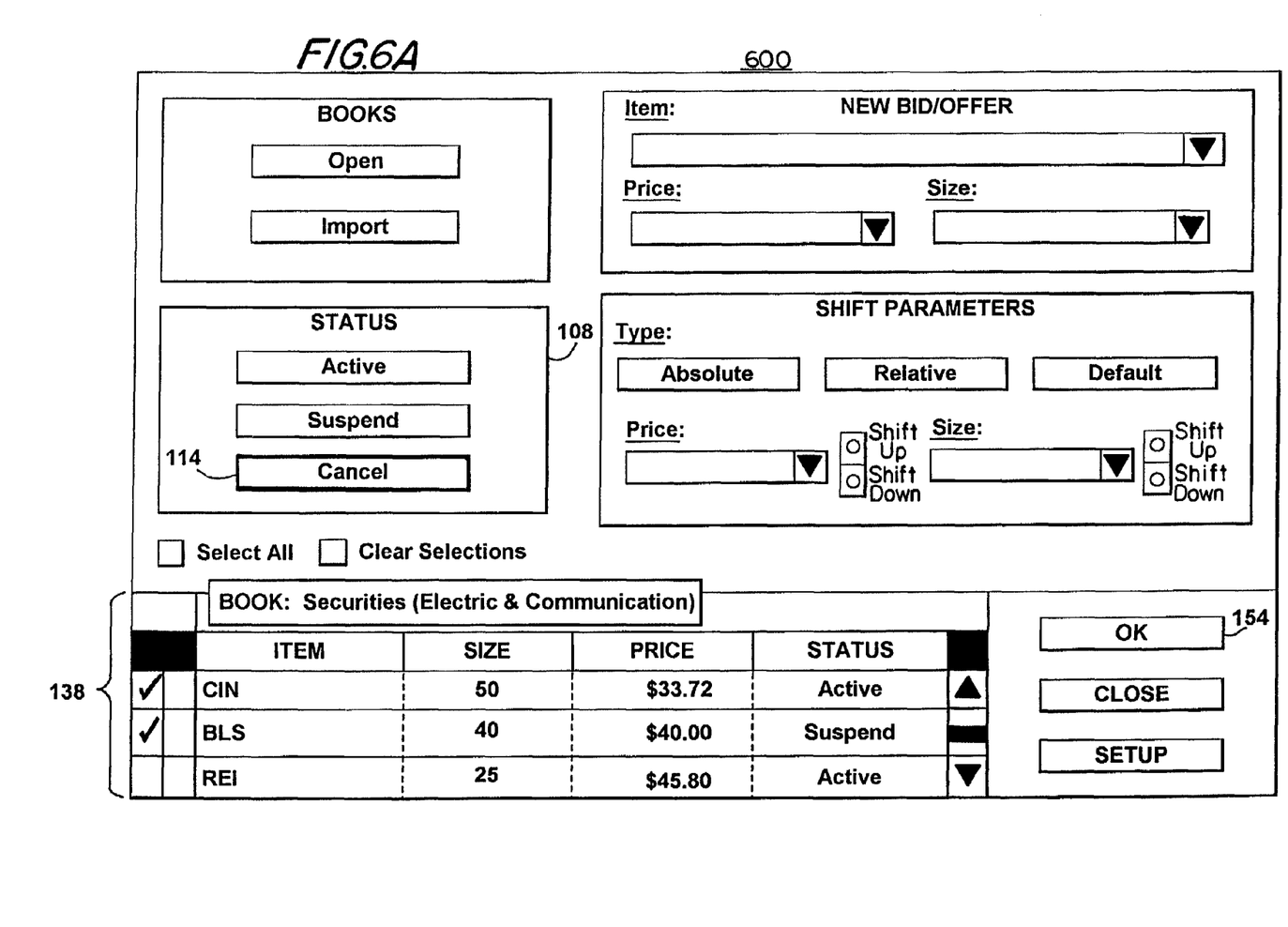
FIGS. 6a and 6b are illustrations of removing multiple bids and/or offers in the trading interface in accordance with certain embodiments of the present invention.
Figure 6B:
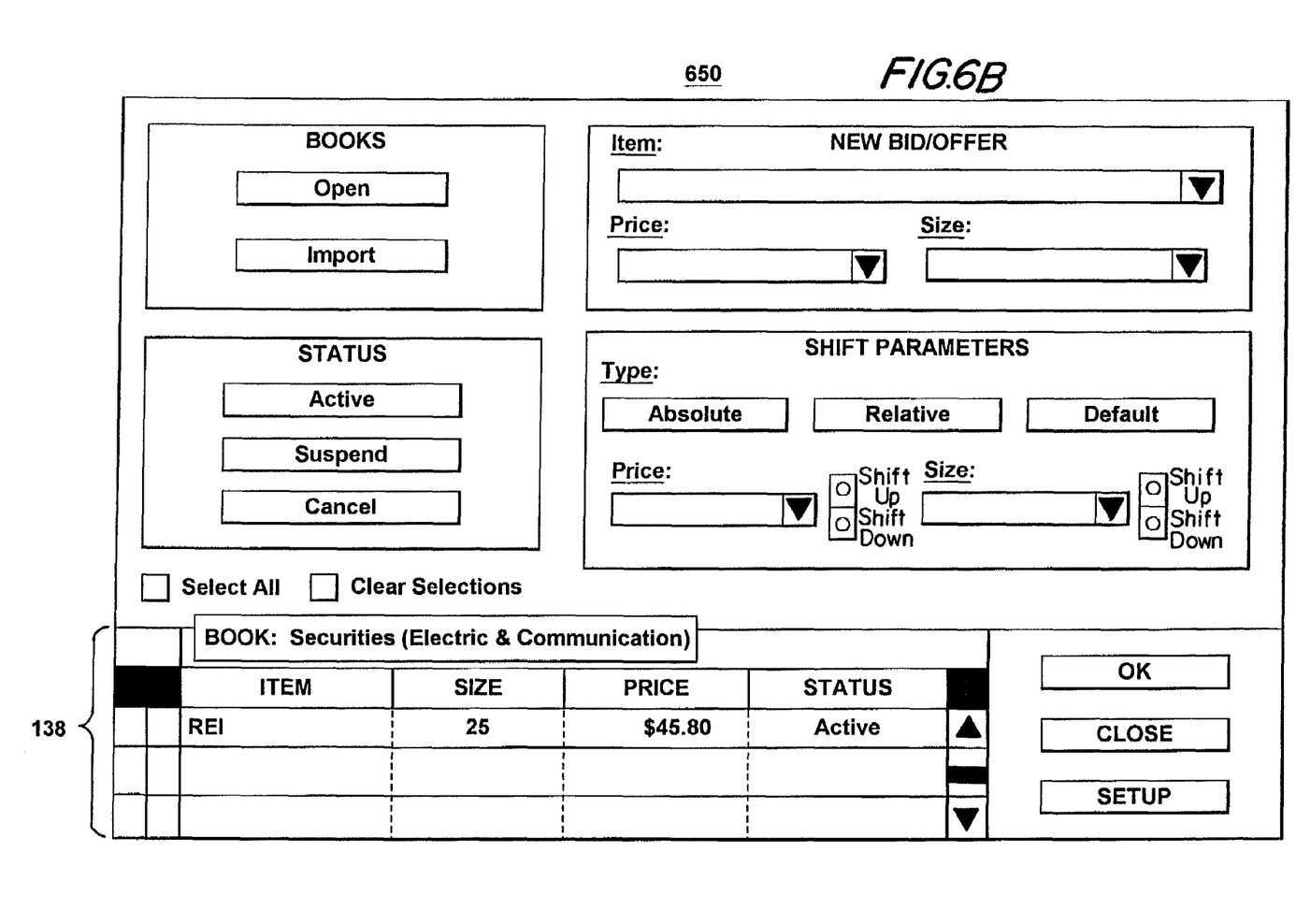

The present invention may, in addition to shifting multiple bids, remove multiple bids. FIGS. 6a and 6b show illustrative displays for removing multiple bid items. Display window 600 of FIG. 6a illustrates a user selecting multiple bids (e.g., items listed in a book) in display 138 for removal. The user may initially select cancel option 114. Once selected, the user may then indicate the bids (e.g., in indication field 402) to which option 114 is to be applied. Once all the proper selections have been made, the user may execute the removal of the bids by selecting "Ok" button 154. Display window 650 of FIG. 6b illustrates the removal of the selected items from display 138 once option 114 has been executed.

Figure 7:
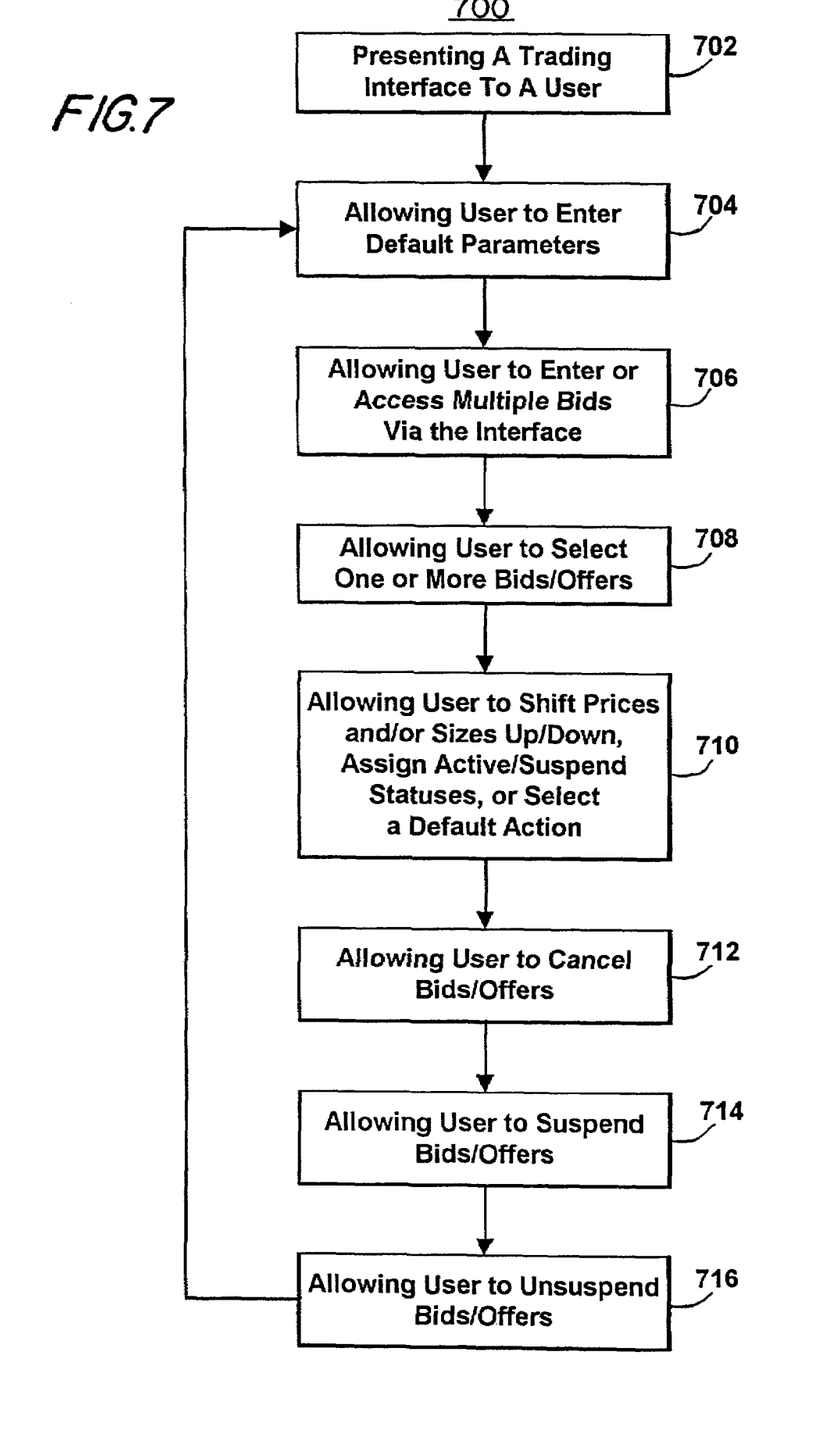
FIG. 7 is a flow diagram of a main process that may be used to perform the functions illustrated in FIGS. 1-6b in accordance with certain embodiments of the present invention.

A process for shifting bids in accordance with the invention is shown in FIG. 7. As illustrated, at step 702, process 700 may initially present a trading interface to a user. Any suitable trading interface may be used (e.g., the trading interface illustrated in FIG. 1). Next, at step 704, process 700 may allow the user to enter default parameters (e.g., using selection menu 302 of FIG. 3). For example, default status and shift parameters may be selected from menus 304 and 314 of FIG. 3. Default shift parameters may be in the form of an absolute or relative value. The default status selected in step 704 may be assigned automatically to new bids, that have yet not been assigned a status, to indicate whether a new bid should be treated as active (and thus available to be hit) or suspended (and thus not available to be hit) when the new bid is entered by the user.

At step 706, process 700 may allow a user to enter multiple bids or import bids, or a bid book, from another application or file. These bids may be listed on display 138. Next at step 708, process 700 may allow the user to select or re-select one or more of the displayed bids. These bids may be selected in any suitable manner. For example, the bids may be selected by making an indication mark in a row assigned to the bid (as illustrated in the trading interface of FIG. 4). Also, any entered bids (either manually entered or imported) may be automatically selected, or automatically selected and shifted, upon entry if some factor of the bid meets a certain condition (e.g., has a price of a related item changed by more than 10%). Criteria for automatic operation may be established through the use of automatic settings option 324 of FIG. 3.

Next, at step 710, process 700 may allow the user to execute specified shifts in bid prices and/or sizes of active and/or suspended bids up or down. When a shift indication is executed, process 700 may shift the values in accordance with the default amount entered at step 704 or an amount entered in step 710.

At step 712, process 700 may allow the user to cancel selected bids (e.g., using cancel option 114 of FIG. 6a). Once canceled, the bids are preferably removed from the trading interface and thus no longer selected (e.g., the transition from FIG. 6a when the cancel option is executed on the items selected in display 138 to updated display 138 of FIG. 6b). At step 714, process 700 may allow the user to suspend selected bids (e.g., using suspend option 112 of FIG. 5a). Once suspended, the bids are preferably no longer active. At step 716, process 700 may allow the user to unsuspend bids (e.g., using active option 110 of FIG. 5b). Once unsuspended, the bids become active. Finally, once step 716 has been completed, process 700 may loop back to step 704.

This flow diagram is only illustrative of the features of the invention at hand. Additional steps and/or paths may be incorporated and the ordering of the steps may be altered while maintaining the inventive scope of the present invention.

Figure 8:
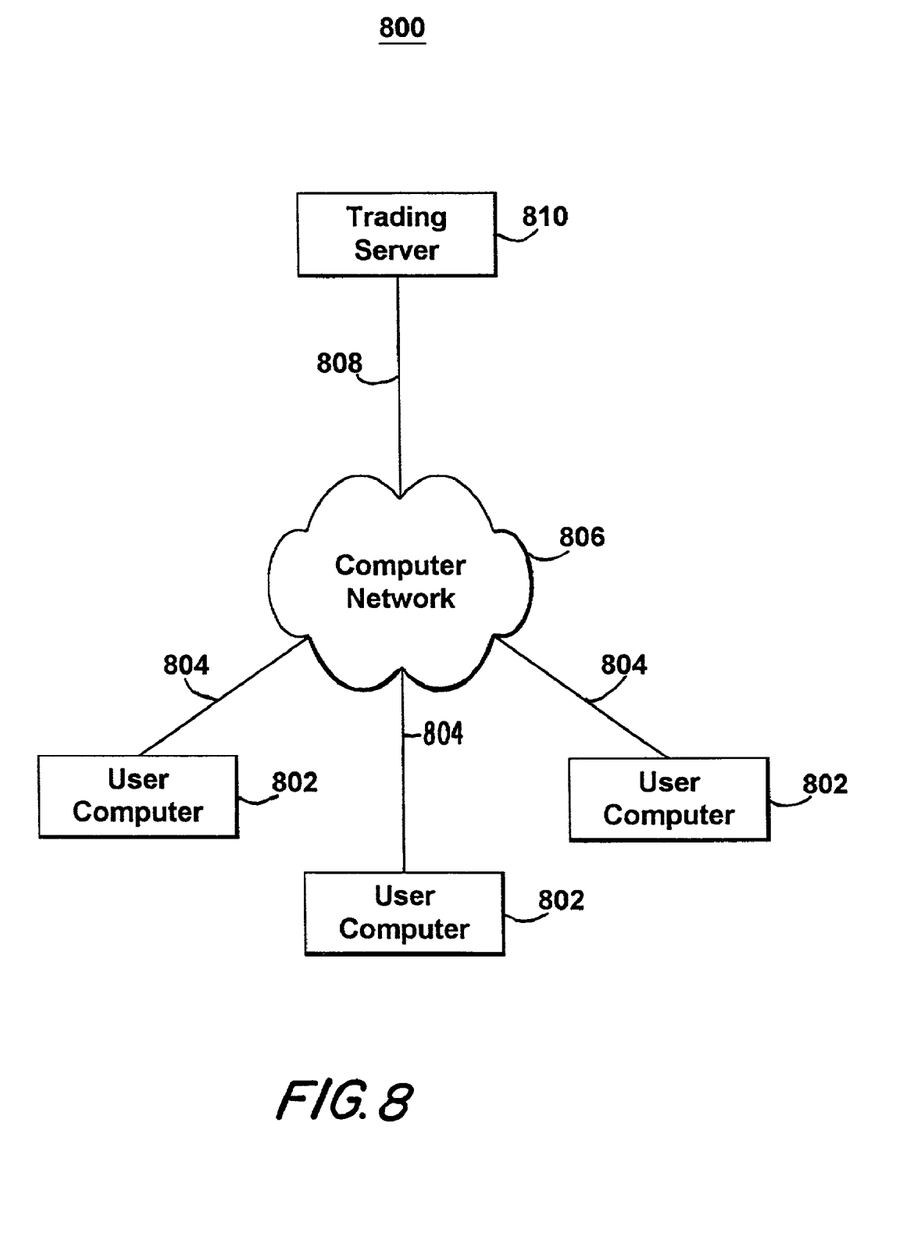
FIG. 8 is a block diagram of a system that may be used to implement the processes and functions illustrated in FIGS. 1-7 in accordance with certain-embodiments of the present invention.

One example of a system 800 for implementing the present invention is shown in FIG. 8. As illustrated, system 800 may include one or more user computers 802 that are connected by one or more communication links 804 to a computer network 806 that is linked via a communication link 808 to a trading server 810.

In system 800, trading server 810 may be any suitable server, processor, computer, or data processing device, or combination of the same. Computer network 806 may be any suitable computer network including the Internet, an Intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communication links 804 and 808 may be any suitable communication links suitable for communicating data between user computers 802 and server 810, such as network links, dial-up links, wireless links, hard-wired links, etc. User computers 802 may be any suitable computers, processors, computer terminals, displays, portable computers, personal digital assistants, or any other suitable data processing devices, or combinations of the same.

Thus it is seen that a trader may efficiently shift and maintain multiple bids through the use of a trading interface. Providing a trader with an ability to shift and remove a plurality of bids may allow the trader to be more time efficient in that the trader may not have to adjust each bid individually. Furthermore, the ability to adjust a plurality of bids may contribute to the trader saving money. One skilled in the art will appreciate that the present invention can be practiced by other than the described embodiments, which are presented for purposes of illustration and not of limitation, and the present invention is limited only by the claims which follow.

What is claimed is:

1. A method comprising:
receiving a plurality of bids and offers from a user, the plurality of bids and offers comprising at least one bid or offer for a first item and at least one bid or offer for a second item different than the first item, each of the plurality of bids and offers having a specified price and size;
causing an interface screen to be displayed at a workstation associated with the user, the interface screen comprising a listing of the plurality of bids and offers received from the user each individually selectable for the user to select multiple of the plurality of bids and offers displayed;
receiving from the user a selection of the bid or offer for the first item and the bid or offer for the second item, and instruction and a value for shifting the price of each of the selected bids or offers; and
shifting simultaneously, in response to the instruction, the price of each of the selected bids or offers by one of an absolute value and a relative value based on the instruction and value received from the user.

2. The method of claim 1, wherein the instruction from the user comprises an indication to apply a relative shift to increase or decrease the price of the plurality of bids or offer and the value comprises a percentage, and wherein the price of each of the selected plurality of bids or offers are increased or decreased based on the specified percentage.

3. The method of claim 1, wherein the interface screen comprises at least one element for the user to select a first instruction from a plurality of instructions comprising an absolute shift instruction and a relative shift instruction, and at least one element for the user to select a second instruction from a second plurality of instructions comprising instruction to increase the price of the selected bids or offers and instruction to decrease the price of the selected bids or offer.

4. The method of claim 1, wherein shifting is performed automatically.

5. The method of claim 1, wherein the listing of the plurality of bids and offers comprises an indication of a status of each of the plurality of bids and offers, and wherein the status of the selected bids or offers comprises an active status, the method further comprising receiving from a user instruction to change the status of the selected bids or offers from the active status to a suspended status, in which hits and takes are blocked from being performed, and changing the status of the selected bids or offers based on the instruction.

6. A method comprising:
receiving a plurality of bids and offers from a user, the plurality of bids and offers comprising at least one bid or offer for a first item and at least one bid or offer for a second item different than the first item, each of the plurality of bids and offers having a specified price and size;
causing an interface screen to be displayed at a workstation associated with the user, the interface screen comprising a listing of the plurality of bids and offers received from the user each individually selectable for the user to select multiple of the plurality of bids and offers displayed
receiving from the user a selection of the bid or offer for the first item and the bid or offer for the second item, and instruction and a value for shifting the size of each of the selected bids or offers; and
shifting simultaneously, in response to the instruction, the size of each of the selected bids or offers by one of an absolute value and a relative value based on the instruction and value received from the user.

7. The method of claim 6, wherein the instruction from the user comprises an indication to apply a relative shift to increase or decrease the size of the plurality of bids or offer and the value comprises a percentage, and wherein the size of each of the selected plurality of bids or offers are increased or decreased based on the specified percentage.

8. The method of claim 6, wherein the interface screen comprises at least one element for the user to select a first instruction from a plurality of instructions comprising an absolute shift instruction and a relative shift instruction, and at least one element for the user to select a second instruction from a second plurality of instructions comprising instruction to increase the size of the selected bids or offers and instruction to decrease the size of the selected bids or offer.

9. The method of claim 6, wherein shifting is performed automatically.

10. The method of claim 6, wherein the listing of the plurality of bids and offers comprises an indication of a status of each of the plurality of bids and offers, and wherein the status of the selected bids or offers comprises an active status, the method further comprising receiving from a user instruction to change the status of the selected bids or offers from the active status to a suspended status, in which hits and takes are blocked from being performed, and changing the status of the selected bids or offers based on the instruction.

11. A system, comprising:
a trading server operative to communicate with a plurality of user computers, the trading server operative to:
receive a plurality of bids and offer from a user, the plurality of bids and offers comprising at least one bid or offer for a first item and at least one bid or offer for a second item different than the first item, each of the plurality of bids and offers having a specified price and size;
cause an interface screen to be displayed at a workstation associated with the user, the interface screen comprising a listing of the plurality of bids and offers received from the user each individually selectable for the user to select multiple of the plurality of bids and offers displayed
receive from the user a selection of the bid or offer for the first item and the bid or offer for the second item, and instruction and a value for shifting the price of each of the selected bids or offers; and
shift simultaneously, in response to the instruction, the price of each of the selected bids or offers by one of an absolute value and a relative value based on the instruction and value received from the user.

12. The system of claim 11, wherein the instruction from the user comprises an indication to apply a relative shift to increase or decrease the price of the plurality of bids or offer and the value comprises a percentage, and wherein the price of each of the selected plurality of bids or offers are increased or decreased based on the specified percentage.

13. The system of claim 11, wherein the interface screen comprises at least one element for the user to select a first instruction from a plurality of instructions comprising an absolute shift instruction and a relative shift instruction, and at least one element for the user to select a second instruction from a second plurality of instructions comprising instruction to increase the price of the selected bids or offers and instruction to decrease the price of the selected bids or offer.

14. The system of claim 11, wherein the trading server shifts the price automatically.

15. The system of claim 11, wherein the listing of the plurality of bids and offers comprises an indication of a status of each of the plurality of bids and offers, and wherein the status of the selected bids or offers comprises an active status, the trading server further operable to receive from a user instruction to change the status of the selected bids or offers from the active status to a suspended status, in which hits and takes are blocked from being performed, and change the status of the selected based on the instruction.

16. A system, comprising:
a trading server operative to communicate with a plurality of user computers, the trading server operative to:
receive a plurality of bids and offers from a user, the plurality of bids and offers comprising at least one bid or offer for a first item and at least one bid or offer for a second item different than the first item, each of the plurality of bids and offers having a specified price and size;
cause an interface screen to be displayed at a workstation associated with the user, the interface screen comprising a listing of the plurality of bids and offers received from the user each individually selectable for the user to select multiple of the plurality of bids and offers displayed
receive from the user a selection of the bid or offer for the first item and the bid or offer for the second item, and instruction and a value for shifting the size of each of the selected bids or offers; and
shift simultaneously, in response to the instruction, the size of each of the selected bids or offers by one of an absolute value and a relative value based on the instruction and value received from the use.

17. The system of claim 16, wherein the instruction from the user comprises an indication to apply a relative shift to increase or decrease the size of the plurality of bids or offer and the value comprises a percentage, and wherein the size of each of the selected plurality of bids or offers are increased or decreased based on the specified percentage.

18. The system of claim 16, wherein the interface screen comprises at least one element for the user to select a first instruction from a plurality of instructions comprising an absolute shift instruction and a relative shift instruction, and at least one element for the user to select a second instruction from a second plurality of instructions comprising instruction to increase the size of the selected bids or offers and instruction to decrease the size of the selected bids or offer.

19. The system of claim 16, wherein the trading server shifts the size automatically.

20. The system of claim 16, wherein the listing of the plurality of bids and offers comprises an indication of a status of each of the plurality of bids and offers, and wherein the status of the selected bids or offers comprises an active status, the trading server further operable to receive from a user instruction to change the status of the selected bids or offers from the active status to a suspended status, in which hits and takes are blocked from being performed, and change the status of the selected plurality of bids or offers based on the instruction.

* * * * *